United States Patent [19]

Wiseman et al.

[11] Patent Number: 4,961,492
[45] Date of Patent: Oct. 9, 1990

[54] ARTICLE CARRYING CONVEYOR AND WEARSTRIP SET THEREFOR

[75] Inventors: John A. Wiseman; James F. Murphy, both of Lynchburg, Va.

[73] Assignee: Simplimatic Engineering Company, Lynchburg, Va.

[21] Appl. No.: 222,970

[22] Filed: Jul. 22, 1988

[51] Int. Cl.$^5$ .............................................. B65G 15/60
[52] U.S. Cl. ...................... 198/841; 198/852
[58] Field of Search ............ 198/841, 852, 837, 851, 198/853, 836, 860.2, 861.1

[56] References Cited

U.S. PATENT DOCUMENTS

| | | | |
|---|---|---|---|
| 3,265,192 | 8/1966 | Stadelman | 198/204 |
| 3,491,873 | 1/1970 | Fauth | 198/841 |
| 3,584,731 | 6/1971 | Dahlem | 198/109 |
| 3,835,982 | 9/1974 | Zappia | 198/841 |
| 3,848,732 | 11/1974 | Catalano | 198/204 |
| 3,881,594 | 5/1975 | Jepsen | 198/204 |
| 3,964,800 | 6/1976 | Grimes et al. | 308/3 |
| 4,479,575 | 10/1984 | Grundken et al. | 198/735 |
| 4,484,674 | 11/1984 | Lunardi et al. | 198/332 |
| 4,511,031 | 4/1985 | Lachonius | 198/836 |
| 4,535,963 | 8/1985 | Lachonius | 248/251 |
| 4,576,277 | 3/1986 | Park et al. | 198/803.01 |
| 4,597,492 | 7/1986 | Lachonius et al. | 198/852 |
| 4,645,070 | 2/1987 | Homeier | 198/852 |
| 4,646,905 | 3/1987 | Grundken et al. | 198/735 |

FOREIGN PATENT DOCUMENTS

| | | | |
|---|---|---|---|
| 767567 | 2/1957 | United Kingdom | 198/852 |
| 2069442A | 8/1981 | United Kingdom | |
| 2121372A | 12/1983 | United Kingdom | |
| 2167371A | 5/1986 | United Kingdom | |
| 2172870A | 10/1986 | United Kingdom | |

*Primary Examiner*—Joseph E. Valenza
*Attorney, Agent, or Firm*—St. Onge, Steward, Johnston & Reens

[57] ABSTRACT

A set of rail facing strips is provided for use with an article carrying conveyor system, the facing strip set comprising a rail facing member for affixing to opposing conveyor guide rails for establishing at least one section of said conveyor where a conveyor chain is relatively freely removable from the conveyor raceway in a direction substantially transverse to the longitudinal axis of said conveyor, said rail facing member being characterized by a first leg for covering at least a pair of outer surfaces of said guide rail, said facing member also having a second leg joined to said first leg at substantially a right angle thereto, said second leg for extending into said raceway and substantially covering inner edges of said guide rails, said second leg being dimensioned and shaped along its length so as to clear a channel formed in said chain, whereby said second leg permits said body to move transversely out of said raceway without inner tabs found in said chain engaging a portion of said second leg to retain said chain in said raceway, the facing strip set further comprising a modified rail facing member for establishing at least one section where said chain is lockingly retained in said raceway by extending into said channel to retain said leg in said raceway.

15 Claims, 7 Drawing Sheets

ARTICLE CARRYING CONVEYOR AND WEARSTRIP SET THEREFOR

FIELD OF THE INVENTION

The present invention relates to an article carrying conveyor and a wearstrip set for the guide rails thereof. More particularly, a conveyor system is disclosed that uses at least two different types of wearstrips or facing strips for lining the rails of the conveyor raceway, one facing strip for permitting the chain to be readily lifted out of or inserted into the raceway in preselected portions such as the upwardly facing straightaways and a modified facing strip for retaining the chain in the raceway in other preselected portions such as on horizontal and vertical curves and on downwardly facing raceways.

BACKGROUND OF THE INVENTION

Devices using a flexible chain, belt, or other transporting surface guided along a conveyor path for moving articles from one point to another are known in the art. A conveyor path is typically laid out or defined by structural members, such as girders establishing a raceway formed along their length for supporting a chain. Drive units, such as a sprocket drive, are disposed along the path for engaging teeth formed in said chain to move said chain along said path. Articles to be conveyed sit on this chain, which may also have cleats or other suitable structure for gripping or catching the articles to be conveyed.

The chain is typically composed of a series of chain links suitable, joined together to form a looped or endless conveying surface that is flexible or articulated to be capable of passing through both vertical and horizontal curves. An example of such a chain is shown in Lachonius, et al. U.S. Pat. No. 4,597,492.

Lachonius U.S. Pat. No. 4,511,031 shows a conveyor said to be comprised of easily mountable girder sections. A conveyor chain 1 is driven and guided in an open track on girder 2. Girder 2 is symmetrical about a horizontal plane, whereby belt 1 returns on the opposite or under side of the girder 2. Strips of plastic material (see U.K. Patent Application No. 2,172,870A) provide bearing surfaces along which the belt moves. Two or more girders may be interconnected.

A problem with the Lachonius device is that the belt 1 is fixedly retained in the track by supporting members or ears formed in the girders that extend inwardly from both sides of the open track to retain said chain. This is necessary because the chain must be restrained against gravity in the return raceway on the bottom track of the girder or in vertical and horizontal curves. Accordingly, if the chain needs to be removed for repair, replacement, or cleaning, either the end of the conveyor path must be available or the entire girder structure broken apart, and the chain must somehow be broken or separated at one point in the endless loop and pulled out sufficiently to reach the trouble spot. When the chain is to be reinserted, it must be laboriously threaded back in. Because conveyor systems can easily reach several hundred feet in length, such a procedure can be awkward, time consuming, and costly.

SUMMARY OF THE PRESENT INVENTION

In accordance with the present invention, a conveyor beam is provided having a raceway and guide rails that are sufficiently wide to permit the chain to be inserted or removed at any point. Facing strips or wearstrips are provided for the rails of the raceway, including a first facing strip for establishing sections of a conveyor path where the chain can be freely lifted out of said raceway and a second, or modified, facing strip for establishing sections of said path where said chain is lockingly retained in said raceway, such as in downwardly facing raceways or raceways in a horizontal or vertical curve.

The conveyor beam can be readily cut, bent, and/or assembled into a conveyor path to fit the particular user's needs. The guide rails of the beam are adapted to receive the facing strips and lockingly retain same, which strips are preferably formed of a plastic material that can readily be cut to desired lengths and affixed to the beam to line the raceway in the shape chosen and also provide a bearing surface for the moving chain. By choosing either the first facing strip or the second, modified facing strip, the user can define sections where the chain can be readily lifted out, as opposed to those sections where the chain is retained in the raceway.

It is an object of the present invention to provide a conveyor system where the transporting surface, such as a chain or belt, can be readily lifted out of or dropped into the conveyor raceway at selected sections thereof for repair, replacement, or maintenance.

It is an object of the present invention to provide a set of facing strips for lining opposing guide rails of a conveyor beam to establish sections where the chain will be liftable out or insertable in, as opposed to sections where the chain cannot be lifted out.

It is an object of the present invention to provide a readily assemblable modular conveyor system comprising a standard, uniform conveyor beam and a set of facing strips and modified facing strips, said facing strip for being mounted on the conveyor beam where said chain is to be removable and said modified facing strip for being mounted on the conveyor beam raceway where said chain is to be not removable.

Further objects and advantages of the present invention will become apparent from the following description of the drawings and the preferred embodiments.

DETAILED DESCRIPTION OF THE PREFERRED EMBODIMENT

Figures 1, 1A:
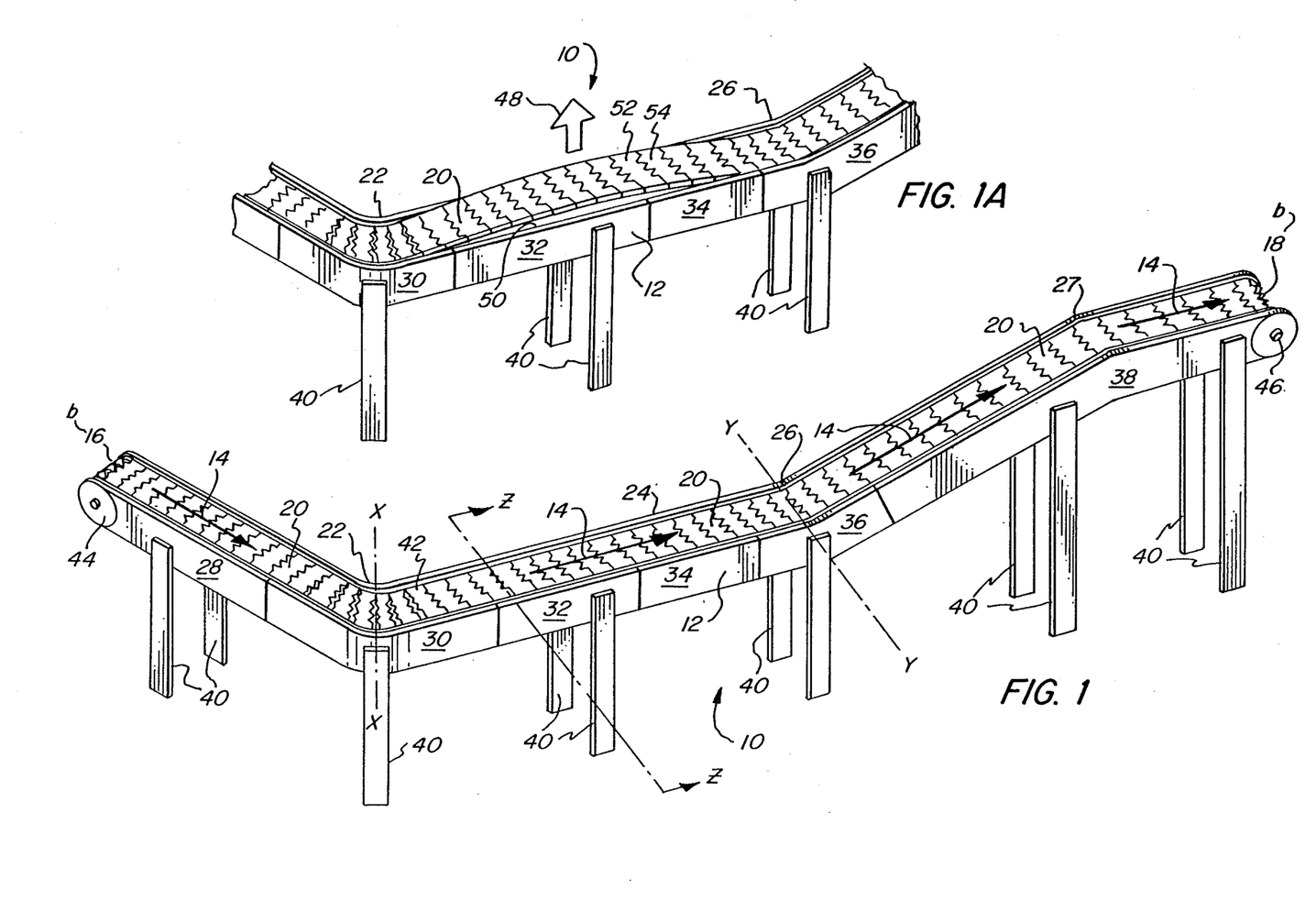
FIGS. 1 and 1A are perspective views of the conveyor system of the present invention, with FIG. 1A showing the chain being lifted out of the conveyor raceway.

FIG. 1 shows a particularly preferred embodiment of the conveyor system of the present invention at 10. Conveyor beam 12, shown in cross-section in FIGS. 2 and 2A as discussed below, defines a path depicted by arrows 14 for conveying articles from area 16 to area 18 by riding moving chain 20 along a longitudinal axis b-b of the conveyor. The path 14 can be any of a variety of layouts chosen by the designer depending upon the particular conveyor application. Here path 14 begins at 16, proceeds through a horizontal curve 22 about vertical axis x-x, down straightaway 24, through vertical curve 26 about horizontal axis y-y, through a reverse vertical curve 27, and terminates at 18. Curve 22 is depicted as being approximately 90, but it is understood that the degree of curvature can be a variety of shapes and angles. Curves 26 and 27 are approximately 5°, by way of example only.

As explained in more detail below, path 14 includes a conveyor beam section 28 as an initial straightaway, horizontally bent or curved section 30 to provide approximately a 90° turn, straight sections 32 and 34, vertically bent or curved section 36 to provide approximately 5° curvature, and another vertically curved section 38 of approximately 5°. All these sections are securely fastened together by routine means.

In a particularly preferred modular conveyor embodiment, the conveyor beam is provided as a uniform stock beam, which can be cut and/or bent and then assembled in sections to form the desired path such as the one shown by example only in FIG. 1. Legs 40 support the conveyor above the floor or other supporting surface.

Horizontal curve 22 is a friction turn, in that the chain 20 passes through the bend in frictional contact with both guide rails of the beam. It is also known in the art to have a wheel or live turn, wherein the inner radius of curve 22 about axis x-x is formed by a wheel rotatable about axis x-x. The portion of the beam 12 adjacent the wheel is cut away, so that the chain passes through the turn guided by one guide rail and the rotatable wheel on the inside. The wheel turn in effect provides a wheel bearing surface for the turn instead of the friction surface. Likewise, curves 26 and 27 could also be wheel turns about axis y-y.

Chain 20 preferably comprises a plurality of substantially uniform links 42 joined together at an appropriately designed joint to form an articulated transporting surface. This chain 20 is flexible or articulatable about horizontal and vertical axes such as x-x and y-y in FIG. 1.

Figure 1B:
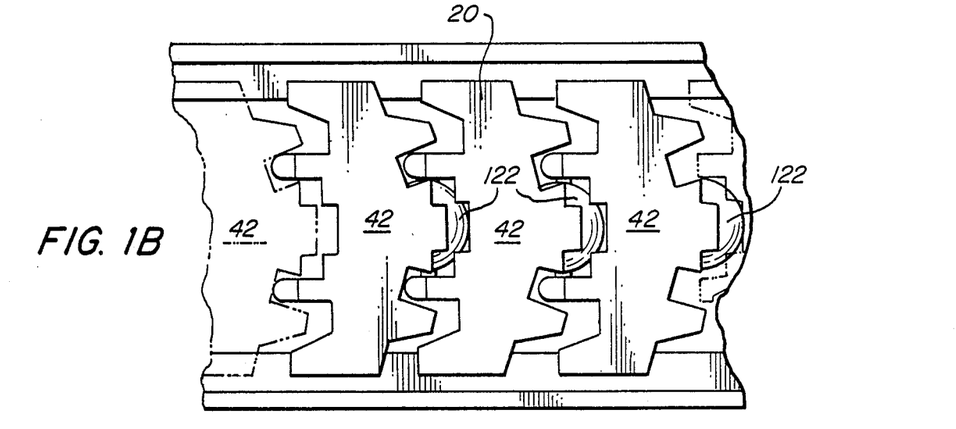
FIGS. 1B, 1C, and 1D show details of the chain at particular points of the system of FIG. 1.
Figure 1C:
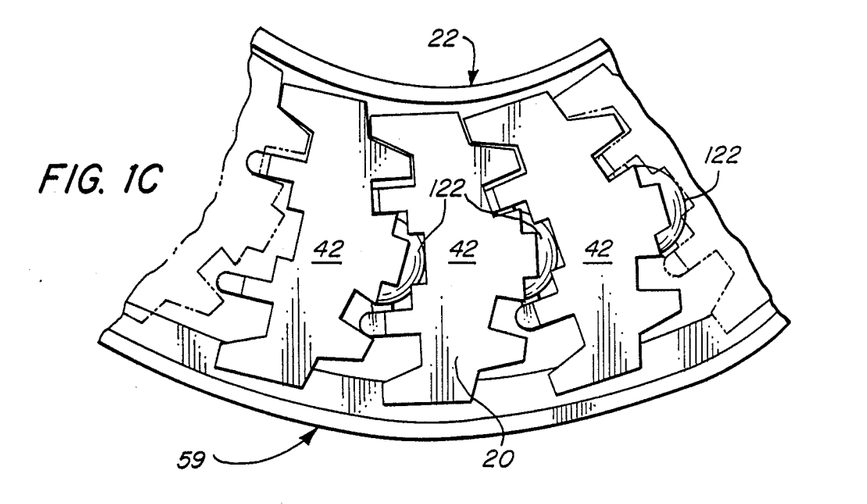
Figure 1D:
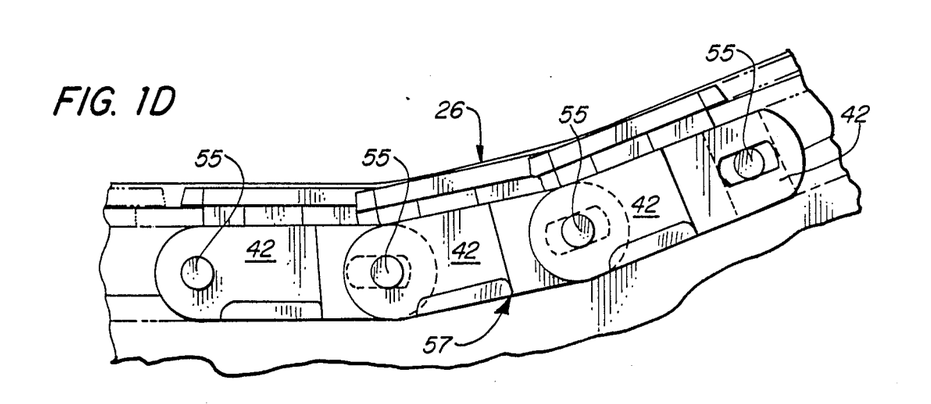

FIG. 1B shows further detail of the conveyor beam 12 with chain links 42 therein in a straightaway section such as 32 or 34. FIG. 1C shows such detail of beam 12 with links 42 as the chain passes through a horizontal turn 22 such as at section 30. FIG. 1D shows a side view of the chain links 42, with the conveyor beam 12 cut away, as the chain passes through vertical curve 26 at section 36.

Chain 20 is propelled along the conveyor path 14 by any suitable propelling means, such as for example a standard drive unit 46 at end 18, with a standard idler unit 44 at end 16. The manner in which drive unit 46 may be used to engage and drive chain 20 is well known in the art.

Chain 20 could also be a belt or other sufficiently flexible transporting surface provided with corresponding tab means as described below.

FIG. 1A shows the conveyor system 10 with chain 20 being lifted out of the beam 12 in straightaways 32 and 34 in a direction defined generally by arrow 48, which is transverse to the direction of said conveyor path and the raceway 50 holding the chain. The distance that chain 20 can be lifted above raceway 50 depends on how tautly the chain is drawn, but there is preferably enough play and clearance between adjacent links to lift chain 20 out far enough to reach under the chain and disconnect the chain between links, for example between links 52 and 54, by having access from underneath to pins 55 seen in FIG. 1D that typically hold chain links 42 to each other. This permits convenient access to raceway 50 and the underside 57 of chain 20 that is not feasible if chain 20 is retained in said raceway.

It will also be appreciated that, while under normal operations there should be no significant force acting on chain 20 in the upwardly facing straightaways in the direction of arrow 48, the situation is significantly different in curves 22 and 26 shown in detail in FIGS. 1C and 1D. There, the normal tension on chain 20 would tend to twist or pull the chain transversely out of the curves, particularly in vertical curve 26. In curve 22, the chain would tend to tip upwards at or pull away from the outer side 59 of the curve and in the return raceway on the lower side (see FIG. 2), the chair would tend to fall downwardly and out of the raceway under the influence of gravity. It is this tendency to fall out of or be pulled from the raceway that is countered by the modified wearstrip members of the present invention.

Figure 2:
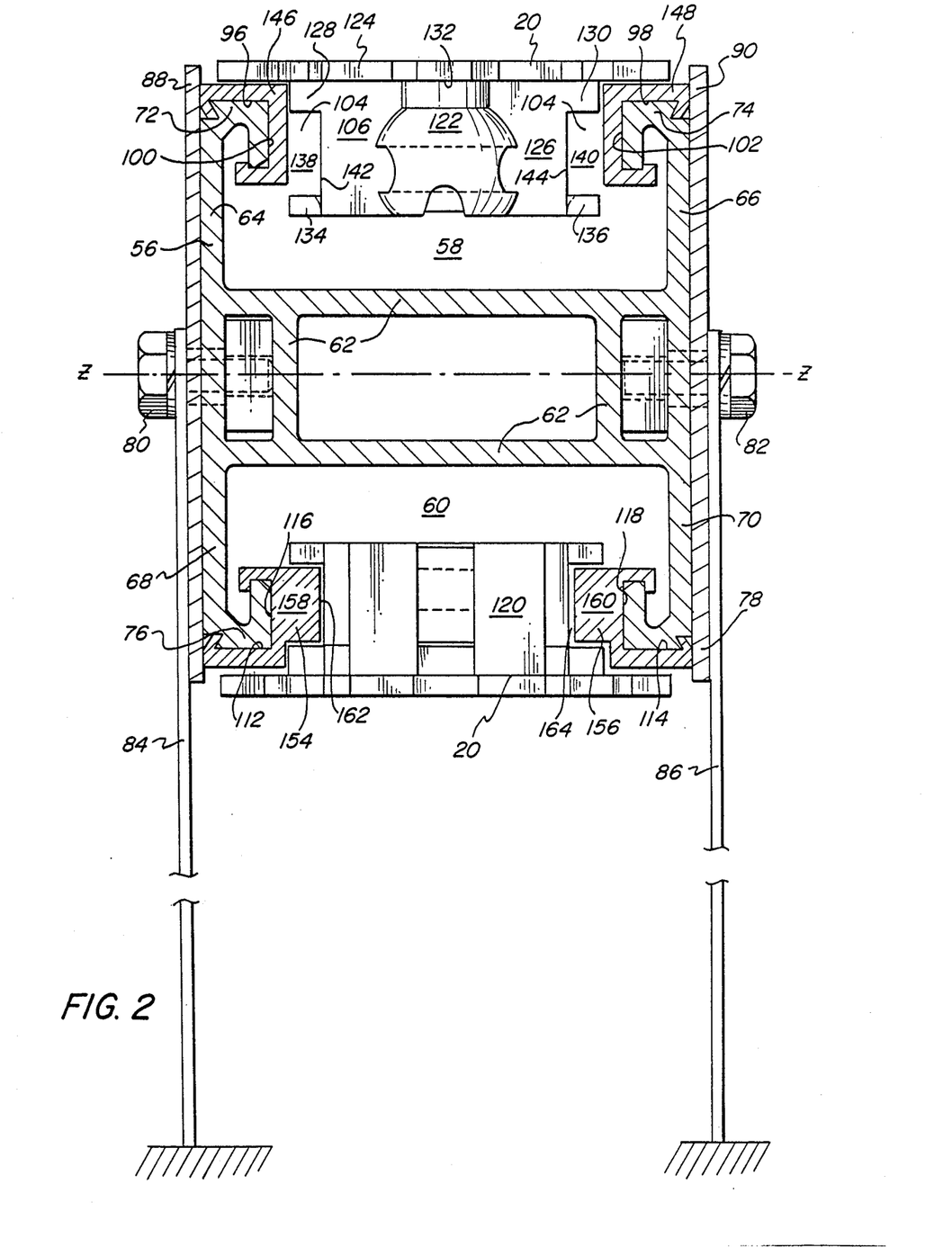
FIG. 2 is a cross-sectional view of the conveyor beam of the present invention with the facing strips and modified facing strips of the present invention mounted thereon.

FIG. 2 shows a cross-section of a preferred embodiment of the conveyor system of the present invention taken at z-z as shown in FIG. 1. A conveyor beam section 56 has a generally square or rectangular cross-section with a generally H-shaped core forming upper and lower raceways 58 and 60. The cross members 62 forming the core are routinely chosen to impart structural integrity to the beam 56, while uprights 64, 66, 68, and 70 provide the structural support for guide rails 72, 74, 76, and 78 respectively. Beam 56 is preferably an aluminum or other suitably sturdy extrusion that can be sawn or cut, bent and otherwise shaped, and then assembled to make up conveyor sections 28, 30, 32, 34, 36, and 38 as shown in FIG. 1. Bolts 80 and 82 can be used to join sections to routine support means 84 and 86 for supporting above the floor. Plates 88 and 90 are further used in routine conjunction with bolts 80 and 82 to assist in joining sections of the conveyor together.

Figures 2A, 3, 4:
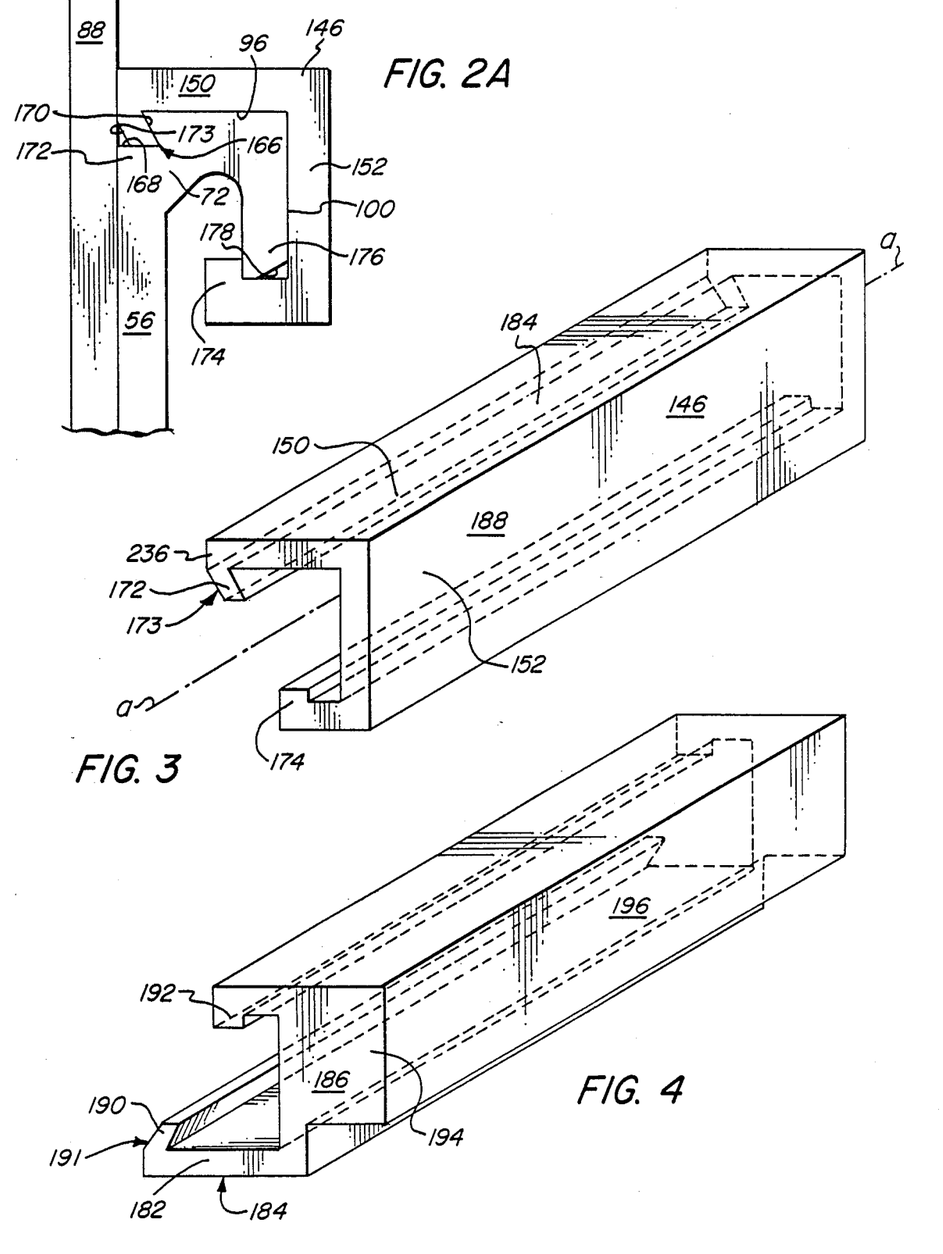
FIG. 2A is a partial cross-sectional, more detailed view of the manner of mounting the facing members onto the conveyor beam.
FIG. 3 is a perspective view of the facing member of the present invention.
FIG. 4 is a perspective view of the modified facing member of the present invention.

Opposed conveyor guide rails 72 and 74 have outer surfaces 96 and 98 and opposed inner edges 100 and 102. A more detailed partial view of rail 72 is shown in FIG. 2A. Opposed inner edges 100 and 102 as shown in FIG. 2 are separated by an open gap 104 to form raceway 58 therebetween for receiving chain 20, with an end view of link 106 shown in FIG. 2. In the preferred embodiment, the beam 56 is symmetrical about axis z-z, and a lower or return raceway is formed by opposed conveyor guide rails 76 and 78, which have outer surfaces 112 and 114 and opposed inner edges 116 and 118 to form the return raceway 60 for chain 20. Link 120 is shown in an end view in the lower raceway 60. It is understood that while the lower half of beam 56 is desirable, it need not be present. Also, it is understood that the use of any terms "upper", "lower", "left", and "right" are used for convenience only and are not intended to limit the scope of the present invention.

The chain 20 is made up of links joined together by suitable joint knuckle means 122 to permit articulation of chain 20. The chain links will be specifically described with respect to link 106, although it is understood that each link is substantially identical, except for routine modifications to the carrying surface which are irrelevant here. For example, some of the chain links may have cleats (not shown) on their upper surfaces for assisting in carrying articles up inclines.

Chain link 106 has a plate portion 124 so dimensioned as to extend over gap 104 adjacent the outer surfaces 96 and 98 of rails 72 and 74. Chain link 106 also has a body portion 126 extending away (here, downwardly) from plate 124 for placement in raceway 58. Body 126 has a first or outer pair of tabs 128 and 130 formed adjacent the juncture 132 of plate 124 and body 126. Tabs 128 and 130 are dimensioned to fit between the edges 100 and 102 so as to substantially oppose sideways movement of chain 20 relative to rails 72 and 74. Body 126 has a second pair of tabs, or inner tabs 134 and 136, formed therein and so spaced from tabs 128 and 130 to define channels 138 and 140 along each side 142 and 144 of body 126 between outer tabs 128 and 130 and inner tabs 134 and 136. Tabs 134 and 136 are dimensioned to permit insertion of chain link 106 and thus chain 20 into raceway 58.

Generally L-shaped wearstrips or facing members 146 and 148 are affixed to rails 72 and 74. Members 146 and 148 provide a bearing surface both in a vertical and also in a side-to-side direction for the chain 20 as it is propelled along the raceway 58. Members 146 and 148 are preferably formed of a plastic or resilient material, such as for example a polyethylene extrusion, that can be cut to desired lengths and suitably affixed to the guide rails. With reference to FIG. 2A, member 146 is characterized by a first leg 150 and a second leg 152 joined together at a substantial right angle to each other. First leg 150 substantially covers outer surface 96 of guide rail 72 to provide a supporting bearing surface, if necessary, for chain 20. The second leg 152 extends into gap 104 and raceway 58 for substantially covering edge 100 and providing a side-to-side bearing surface for chain 20 to keep chain 20 properly aligned in the raceway by engaging said outer tab 128. A similar arrangement is provided on the right hand side of beam 56.

The second leg 152 of the facing member is shaped and has a thickness so as to not extend into the channel 138 formed by tabs 128 and 134.

The opposing facing member 148 is likewise so shaped and, because outer tabs 128 and 130 restrict the side-to-side movement of link 106, link 106 and associated links forming the chain in the vicinity can be lifted straight up and out as shown in FIG. 1A.

The shape and dimensions of facing members 146 and 148 are to be compared to modified facing members 154 and 156, which are in all essential respects the same except that modified facings 154 and 156 have thicker second legs 158 and 160 that extend into channels 162 and 164 to retain chain link 120 and associated links in raceway 60 against transverse forces, such as the force of gravity. Lengths of modified facing members 154 and 156 are for use not only along the lower, downwardly facing raceways such as raceway 60, but also along vertically and horizontally curved sections of the beam or raceway or other sections where chain tension would tend to pull the chain out of the raceway.

It is also understood that facing members and modified facing members need not always be applied to the rails in matched pairs. For example, if the chain tends to be pulled out at one side only, then the modified strip may need be applied only to that side.

The facing members 146, 148 and the modified facing members 154, 156 are affixed to their respective guide rails by any suitable means, which could include by way of example gluing, riveting, or other suitable method. However, the preferred method is depicted in detail in FIG. 2A. A V-shaped groove 166 runs along guide rail 72 parallel to and opposite edge 100 and raceway 58. Groove 166 is preferably undercut towards raceway 58 at approximately about a 60° angle formed by sidewalls 168 and 170. Facing member 146 has a correspondingly shaped tongue 172 in the first leg 150 that fits into groove 166. Once the tongue 172 is pressed into groove 166, the second leg 152 of member 146 can be pressed onto and overt the inner edge 100 of rail 72. Shoulder 174 is then snapped over lip 176 on rail 72. Tongue 172 has a bevelled surface 173 to facilitate mounting of the facing member on the guide rail as further described in detail below. Bevel 178 on the guide rail eases the movement of shoulder 174 over lip 176 to permit the facing member 146 to be lockingly engaged with said side rail, preferably in a snapping manner. The other facing members are preferably mounted on their respective guide rails in essentially the same manner.

FIG. 3 shows length of the facing member 146 or wearstrip of the present invention in perspective. Member 146 extends along a longitudinal axis a-a, which will generally be parallel to the longitudinal axis b-b of the conveyor 10 at the point where member 146 is affixed. First leg portion 150 provides surface 184 for the up-and-down bearing surface for the chain, while second leg portion 152 provides surface 188 for side-to-side bearing surface. Tongue 172 with bevel 173 and shoulder 174 are for mounting the strip on the guide rail. The cross-sectional shape and dimension of leg 152 permit ready insertion and removal of the chain.

FIG. 4 shows the modified facing with corresponding surface 184, leg 182, tongue 190, bevel 191, and shoulder 192. However, leg 186 is enlarged as at 194 to extend surface 196 into the chain channels to lockingly engage the chain.

The beam and wearstrips of the present invention are particularly useful for a modular conveyor system, where the conveyor designer and/or installer is provided with lengths of uniform, stock beams and both facings and modified facings. The beams can be cut and/or bent and assembled to form the desired conveyor path. The facing members can likewise be cut to appropriate lengths and affixed to the rails, the modified facing members being used in the downwardly facing raceways and horizontal and vertical curves.

The modified facing is also preferably used on the outer rail of wheel turns to prevent the chain from being pulled out of the turn. In such an application, there is no opposing facing member on the wheel, but rather a single facing on the outer rail.

Figure 5:
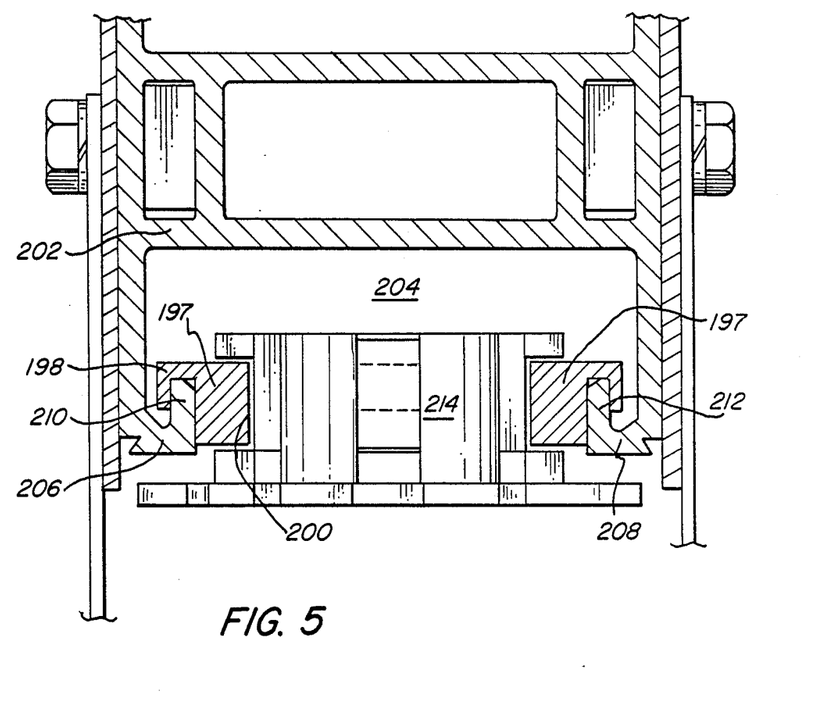
FIG. 5 is a perspective view of another preferred embodiment of the modified facing member.
Figure 5A:
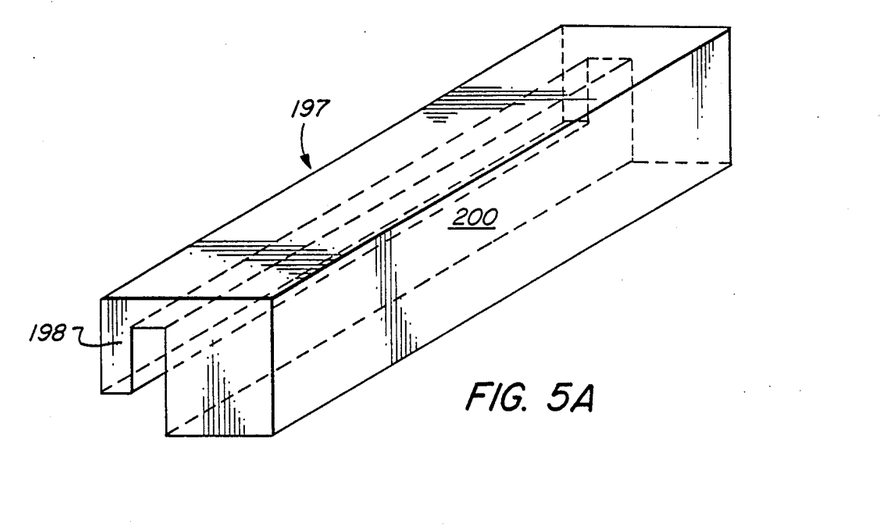
FIG. 5A is an end view of the lower raceway of a conveyor beam with the embodiment of FIG. 5 attached thereto.

FIG. 5 shows an alternative embodiment 197 to FIG. 4 of the modified facing member with easier mounting characteristics for use primarily on downwardly racing raceways. The shoulder 192 shown in FIG. 4 is eliminated, as is tongue 190. Instead, arm 198 simply clips over the guide rail, and surface 200 extends into the chain channels to lockingly engage the chain. The alternative embodiment 197 of FIG. 5 is particularly useful on the downwardly facing raceways, because member 197 is easier to push on or clip over the rail and is retained over the rail by arm 198, as shown in FIG. 5A.

In FIG. 5, beam 202 has lower raceway 204 with opposing rails 206 and 208. The alternative embodiment 197 of FIG. 5 is mounted on opposing members 210 and 212 of rails 206 and 208 respectively. A chain link 214 is shown riding between the facing members 197 and retained in raceway 204 against the force of gravity.

Figure 6:
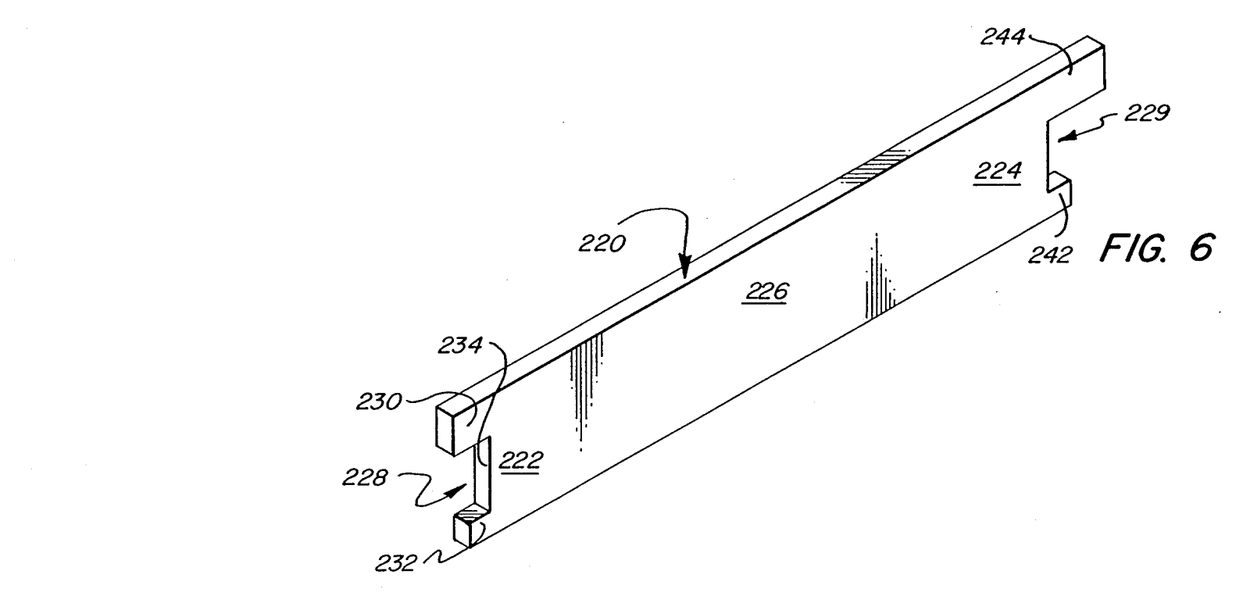
FIGS. 6 and 6A are perspective and end views respectively of a tool for mounting the wearstrips of the present invention onto the conveyor beam of the present invention.
Figure 6A:
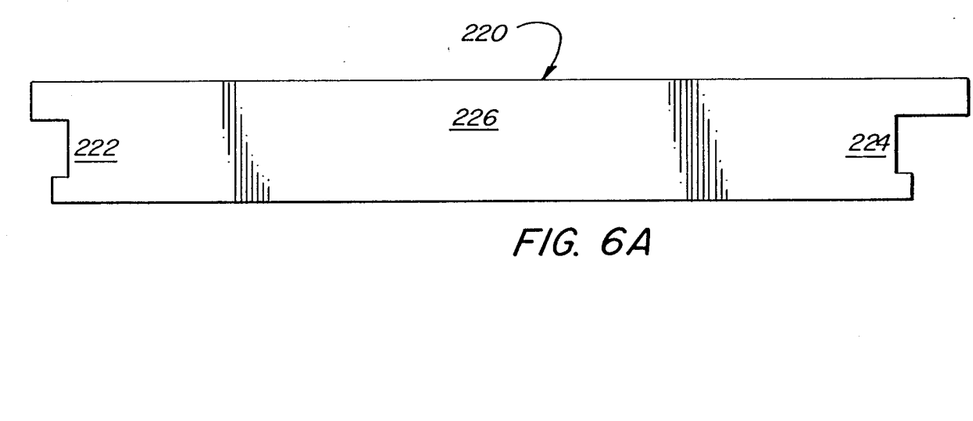

FIG. 6 shows a perspective view and FIG. 6A a side view of a particularly preferred embodiment of a tool 220 for use in mounting the wearstrip sets of the present invention onto the guide rails. FIGS. 7A-7D show how tool 220 is used in mounting the wearstrip such as wearstrip 146 shown in FIGS. 2 and 2A onto the guide rail 72. Tool 220 is particularly preferred for the regular or non-modified wearstrip 146; however, a similar tool could also be used for the modified wearstrip such as wearstrip 186 by simply shaping the tool to have a wider mouth for gripping the wider wearstrip.

In FIGS. 6 and 6A, tool 220 has wrench-like couplings 228 and 229 on both ends 222 and 224 of bar 226 for grasping the wearstrip 146 and torquing or turning wearstrip 146 onto rail 72 as depicted in FIGS. 7A-7D. The structure of tool 220 is best understood by reference to FIGS. 7A-7D in conjunction with FIGS. 6 and 6A.

At end 222, bar 226 has a substantially U-shaped, wrench-like coupling 228 with prongs 230 and 232 open to a floor 234. Coupling 228 is shaped and dimensioned to fit over and grasp the first leg 150 of wearstrip 146. Prong 232 has a length or depth relative to floor 234 approximately corresponding to the width of surface 236 on wearstrip 146, which is adjacent tongue 172 and defines the termination point of first leg 150 opposite the second leg 152. Prong 230 has a length substantially less than the length of second leg 152, for reasons described below. Floor 234 abuts first leg 150 along its length, and prongs 230 and 232 are separated by a distance permitting a relatively snug fit about the first leg 150, as shown in FIG. 7A.

Figure 7A:
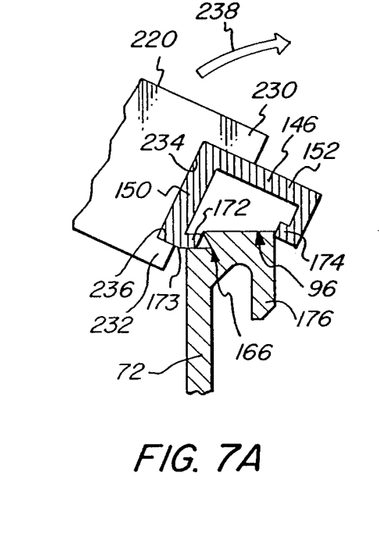
FIGS. 7A, 7B, 7C, and 7D are schematic representations of how the tool of FIG. 6 is used to mount the wearstrip of the present invention to the conveyor beam.

To affix strip 146 to rail 72, tongue 172 is positioned in groove 166 at the angle shown in FIG. 7A. It is seen that bevel 173 permits the strip 146 to be cocked at a fairly steep angle with shoulder 174 resting on edge 100 as shown in FIG. 7A. Were it not for bevel 173, such a steep angle would not be possible, as first leg 150 would have to lie closer rail surface 96 for tongue 172 to fit into V-shaped groove 166. Tool 220 is then used to grasp strip 146 as described above and shown in FIG. 7A, and torque is applied — preferably by hand as with any hand tool — in the direction of arrow 238, which is generally from tongue 172 towards shoulder 174.

Figure 7B:
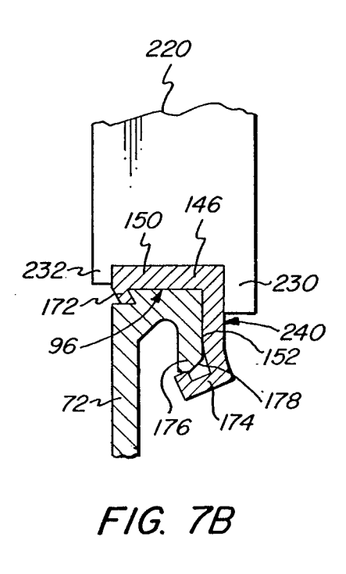
Figure 7C:
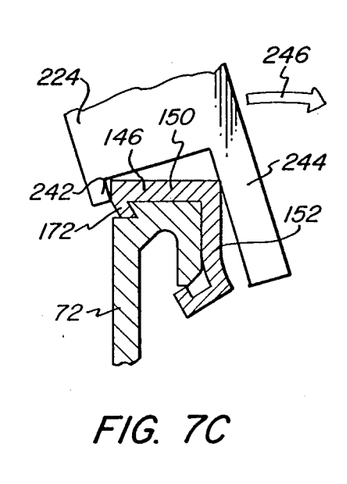

As seen in FIG. 7B, as tool 220 is turned to force first leg 150 about a pivot point in the region of tongue 172 in groove 166 towards surface 96, the shoulder 174 is forced downwardly along edge 100 towards lip 176. Because prong 230 is substantially shorter than second leg 152, second leg 152 is permitted to belly or flex outwardly in the region of shoulder 174 indicated generally by reference numeral 240. Bevel 178 facilitates the sliding of shoulder 174 around the lower tip of edge 100.

Figure 7D:
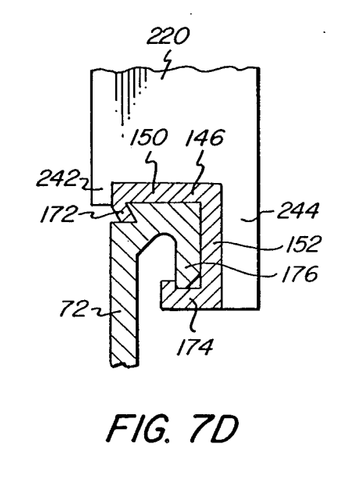

Tool 220 is therefore removed and end 224 is used, wherein prong 242 corresponds to prong 232 and prong 244 is longer than prong 230 to have a length approximately corresponding to the length of second leg 152. Torque is again applied in the direction of arrow 246 to force shoulder 174 into final snapping engagement with lip 176 as shown in FIG. 7D.

It is understood that tool 220 could also be separated into two tools, the first tool having the first coupling and the second tool having the second coupling.

It should be understood that various changes and modifications to the preferred embodiments described above will be apparent to those skilled in the art. Such changes and modifications can be made without departing from the spirit and scope of the present invention, and it is therefore intended that such changes and modifications be covered by the following claims.

We claim:
1. A conveyor beam system for use with an article carrying chain, said beam system comprising:
(a) at least one conveyor beam of substantially rectangle shaped cross section having a first side forming at least one pair of opposed guide rails in said first side thereof, said rails having outer surfaces for supporting said chain and opposed inner edges separated by an open gap to form a raceway therebetween for receiving said chain, said raceway being open to said one side, said conveyor beam being formable into predetermined lengths, each said length being further formable into desired curved shapes, said lengths of said beam being assemblable into a conveyor path along which articles can be conveyed by moving said chain mounted in said raceway, said first side of said beam corresponding to a first side of said rectangle having said raceway formed therein, said beam having a cross-section substantially symmetrical about an axis through said cross-section that is substantially parallel to said first side, said beam having a second raceway formed in the opposite side of said beam that corresponds to the opposite side of said rectangle, both first and second raceways being adapted to have either a wearstrip means or a modified wearstrip means affixed thereto; and
(b) a said wearstrip means for covering part of said guide rails to cover at least a portion of said outer surfaces and opposed inner edges, said wearstrip having a shape and being dimensioned so that the chain can be relatively freely removed from said raceway in a direction generally transverse to the path of said conveyor, whereby sections of said conveyor path are configured to permit said chain to be freely lifted out of said raceway; and
(c) said modified wearstrip means having a modified shape and dimension to lockingly engage said chain in said raceway to retain said chain in said raceway in a direction transverse to said raceway,
whereby said wearstrip means can be affixed to said beam to establish sections of said path where said chain can be freely lifted out and said modified wearstrip means can be affixed to said beam to establish sections of said path where said chain is lockingly engaged in said raceway.

2. The conveyor beam system defined in claim 1 wherein the system is further defined as comprising d. wearstrip means having a first leg for covering at least a part of said outer surfaces of said guide rail, said wearstrip means also having a second leg jointed to said first leg at substantially a right angle thereto, said second leg for extending into said raceway and substantially covering said inner edges of said guide rails, said second leg being dimensioned and shaped along its length so as to clear said channel, whereby said second leg permits said chain to move transversely out of said raceway;

e. means for affixing said length of said wearstrip means to said guide rails;

f. modified wearstrip means having a first leg for covering at least a part of said outer surface of said guide rail and also having a second leg dimensioned and shaped along its length to extend into said raceway to retain said chain in said raceway in said transverse direction; and g. means for affixing said length of said modified wearstrip to said guide rails.

3. The conveyor beam system defined in claim 2, wherein said outer surfaces of said guide rails comprise means for retaining said first leg of the wearstrip means or the modified wearstrip means onto said outer surface, and said inner edges comprise means for retaining said second leg thereon, and said wearstrip means and modified wearstrip means comprise corresponding means on said first and second legs for engaging said first and second leg retaining means to secure said wearstrip means or modified wearstrip means onto said guide rails.

4. The wearstrip means and modified wearstrip means of claim 3, wherein said first leg retaining means comprises shaped groove means extending substantially parallel to said longitudinal axis, and said second leg retaining means includes lip means extending substantially parallel to said axis, and said first leg engaging means includes tongue means correspondingly shaped to mate with said groove means and said second leg engaging means includes shoulder means correspondingly shaped to mate with said lip means.

5. The wearstrip means and modified wearstrip means of claim 4, wherein said tongue means has a bevelled outer surface where said tongue means is joined to said first leg.

6. The wearstrip means and modified wearstrip means of claim 4, wherein said shaped groove means includes a V-shaped groove open on one side thereof to said outer surface, said groove being undercut towards said raceway along its length, and each of said wearstrip means and modified wearstrip means has said first leg with a correspondingly V-shaped tongue running along its length at the end of said first leg opposite the end for placing adjacent the raceway, and said shaped lip means comprises a bevel facing towards said raceway for reducing the force necessary to push said shoulder means over said lip means to lockingly engage same to retain said wearstrip means and modified wearstrip means therein.

7. The wearstrip means and modified wearstrip means of claim 6, wherein said V-shaped tongue is bevelled on an outer surface thereof.

8. The wearstrip means and modified wearstrip means of claim 6, wherein said V-shaped groove is formed by a pair of sidewalls, and the angle between said sidewalls is approximately about 60°, and said V-shaped tongue is formed by two surfaces joined at a corresponding angle of approximately about 60°.

9. The wearstrip means and modified wearstrip means of claim 6, wherein said wearstrip means and modified wearstrip means are formed from a resilient material, and said V-shaped tongue is depressible into said groove, said means being sufficiently flexible to permit said means to be pushed over said guide rail while retaining said tongue in said groove and secure said shoulder over said lip to retain said means on said guide rail.

10. The modular conveyor beam system of claim 1, wherein said conveyor path includes a length of conveyor beam formed into a vertical curve to provide a vertical curve in said path, and said modified wearstrip means is affixed to at least a portion of said vertical curve.

11. The modular conveyor beam system of claim 1, wherein said conveyor path includes a length of conveyor beam formed into a horizontal curve to provide a horizontal curve in said path, and said modified wearstrip means is affixed to at least a portion of said horizontal curve.

12. The modular conveyor beam system of claim 1 or claim 10, wherein said wearstrip means comprise a plastically deformable material that can be readily cut into predetermined lengths, and said guide rails include means for lockingly receiving said predetermined lengths of said wearstrip means, and said wearstrip means include means for gripping said lockingly receiving means to lockingly retain said wearstrip means thereon, whereby said lengths of said beam can be shaped and assembled into a desired conveyor path and said wearstrip means can be cut into corresponding lengths and secured onto said guide rails.

13. The modular conveyor system of claim 12, wherein lengths of said beam are assembled into a path including at least one vertical curve, at least one horizontal curve, and at least one straight section, and said modified wearstrip means is affixed to at least portions of said curved sections.

14. The modular conveyor beam system of claim 1, wherein said conveyor beam is assembled to provide a chin pathway in said first raceway and a chin returnway in said second raceway, and said conveyor beam is so oriented as to dispose said first raceway to face in a generally upward direction and said second raceway to face in a generally downward direction, and said modified wearstrip means are affixed to at least a portion of said second raceway to retain said chain in said returnway therein against the force of gravity.

15. The modular conveyor system of claim 14, wherein said lockingly receiving means includes a retaining groove formed in said upper surface of said guide rails parallel to said raceway and a retaining lip formed in said inner edges parallel to said raceway, and said wearstrip means are shaped to fit over said outer surfaces and inner edges, and said gripping means includes a tongue running parallel to a longitudinal axis of said member and having a shape corresponding to said retaining groove, said tongue for being inserted into said groove, and said wearstrip means further having a shoulder running parallel to said longitudinal axis and having a shape adapted to snapping-ly engage said lip and be retained thereby, said tongue being on a first leg of said wearstrip means and said shoulder being on a second leg of said wearstrip means joined to said first leg at substantially a right angle thereto.

* * * * *